US007650306B2

(12) United States Patent
Barany et al.

(10) Patent No.: US 7,650,306 B2
(45) Date of Patent: Jan. 19, 2010

(54) TRANSACTION STRUCTURE FOR ISSUING INFLATION-LINKED SECURITIES

(75) Inventors: T. Jeffrey Barany, New York, NY (US); Shalabh Garg, New York, NY (US)

(73) Assignee: Morgan Stanley, New York, NY (US)

( * ) Notice: Subject to any disclaimer, the term of this patent is extended or adjusted under 35 U.S.C. 154(b) by 706 days.

(21) Appl. No.: 10/806,835

(22) Filed: Mar. 23, 2004

(65) Prior Publication Data
US 2005/0216387 A1 Sep. 29, 2005

(51) Int. Cl.
G06Q 40/00 (2006.01)
(52) U.S. Cl. .......................................... 705/37; 705/35
(58) Field of Classification Search .................... 705/35, 705/36 R
See application file for complete search history.

(56) References Cited

U.S. PATENT DOCUMENTS

| 5,742,775 | A  | * | 4/1998  | King ............................. 705/38 |
| 6,321,212 | B1 | * | 11/2001 | Lange ........................ 705/36 R |
| 7,165,048 | B2 | * | 1/2007  | Heppenstall, Jr. ............. 705/37 |
| 2002/0111891 | A1 | * | 8/2002 | Hoffman et al. .............. 705/36 |
| 2003/0023525 | A1 | * | 1/2003 | Chen ........................... 705/35 |
| 2003/0083972 | A1 | * | 5/2003 | Williams ..................... 705/36 |
| 2004/0044611 | A1 | * | 3/2004 | Heppenstall, Jr. ............. 705/37 |
| 2005/0075976 | A1 | * | 4/2005 | Woodruff et al. ............. 705/40 |
| 2005/0119962 | A1 | * | 6/2005 | Bowen et al. ................. 705/37 |
| 2005/0137956 | A1 | * | 6/2005 | Flory et al. ................... 705/37 |
| 2005/0216384 | A1 | * | 9/2005 | Partlow et al. ................ 705/35 |
| 2006/0041453 | A1 | * | 2/2006 | Clark et al. ..................... 705/4 |

OTHER PUBLICATIONS

Dutch Authority Enters Cross-Currency I-Rate Swap Derivatives Week. New York: Nov. 10, 2003.*
Managing risk with derivatives Corporate Finance. London: Mar. 2003.*
Wrase, "Inflation—Indexed Bonds: How Do They Work?," *Business Review*, Jul./Aug. 1997.
Van Bezooyen, et al., "Investing in Inflation—An Overview," *Morgan Stanley Global Pensions Quarterly*, Nov. 2001.
Stumpp et al., "Inflation—Indexed Bonds: A Primer for Finance Officers," *Government Finance Review*, Feb. 2003.
Structured Asset Trust Unit Repackagings (SATURNS), AT&T Corp. Debenture Backed, Series 2003-14, Sep. 26, 2003.

* cited by examiner

*Primary Examiner*—Daniel S Felten
*Assistant Examiner*—William E Rankins
(74) *Attorney, Agent, or Firm*—K & L Gates LLP

(57) ABSTRACT

Transaction structures for issuing inflation-linked securities are disclosed. According to various embodiments, the transaction structure includes an entity purchasing fixed income securities issued by an issuer. The fixed income securities may have been previously issued by the issuer as part of a single, previous offering by the issuer or they could be newly issued by the issuer to the entity. The method also includes the entity and a swap counterparty entering into an inflation swap agreement. The inflation swap agreement obligates the entity to make periodic fixed payments to the swap counterparty in exchange for periodic floating payments from the swap counterparty dependent upon an inflation index, such as the Consumer Price Index (CPI). The method further comprises issuing, by the entity, inflation-linked securities to investors. The inflation-linked securities, which may be bonds, may have a principal amount and/or an interest rate that is indexed to the inflation index.

8 Claims, 3 Drawing Sheets

TRANSACTION STRUCTURE FOR ISSUING INFLATION-LINKED SECURITIES

BACKGROUND

The present invention is related generally to inflation-linked securities and, more specifically, to transaction structures for issuing inflation-linked securities.

Inflation-linked or inflation-indexed securities, such as inflation-linked bonds, are securities that protect against inflation. Such bonds are typically principal indexed or coupon linked, meaning their principal or coupon rate is linked to the change in inflation over a period of time as measured by an inflation index, such as the Consumer Price Index (CPI). In a principal-indexed bond, the principal amount increases with inflation and a fixed interest rate is applied to this increased amount. This causes the interest payment to increase over time if inflation increases. At maturity, the principal is repaid at the inflated amount. In a coupon-linked bond, the principal amount remains fixed and a variable interest rate, related to an inflation index, is applied to the principal.

Currently, issuers of inflation-linked bonds tend to be sovereign entities or private (i.e., non-governmental) companies having high credit ratings, such as utilities or financial institutions. Many other private companies are unwilling or reluctant to issue inflation-linked bonds because of unattractive accounting treatment for the swap that is used to hedge their inflation exposure on such a bond. As such, investors are not currently able to receive enhanced yield on such instruments by taking credit risk of less creditworthy issuers. Additionally, if more investors seek to protect themselves against inflation by purchasing inflation-linked securities, there may not be enough supply of inflation-linked securities to meet the demand.

SUMMARY

In one general aspect, embodiments of the present invention are directed to a method of issuing inflation-linked securities. The method includes, according to various embodiments, purchasing, by an entity, fixed income securities (e.g., bonds) issued by an issuer. The fixed income securities may have been previously issued by the issuer as part of a single, previous offering by the issuer. Alternatively, the fixed income securities may be directly purchased by the entity from the issuer. The method also includes the entity and a swap counterparty entering into an inflation swap agreement. The inflation swap agreement obligates the entity to make periodic fixed payments to the swap counterparty in exchange for periodic floating payments from the swap counterparty dependent upon an inflation index, such as the Consumer Price Index (CPI). The method further involves the issuance of inflation-linked securities by the entity to investors. The inflation-linked securities, which may be bonds, may have a principal amount and/or an interest rate that is indexed to the inflation index. In this way, inflation-linked securities involving credit exposure to a third party issuer may be issued despite the fact that such issuer may not wish to issue inflation-linked securities itself.

In another general aspect, embodiments of the present invention are directed to a security, such as a debt security (e.g., bond or note), a trust-preferred share, etc. The security may comprise a principal amount and/or an interest rate that is related to an inflation index, such as CPI. The security is offered by an entity which (i) purchased fixed income securities issued by an issuer and (ii) entered into an inflation swap agreement with a swap counterparty. The inflation swap agreement obligates the entity to make periodic fixed payments to the swap counterparty in exchange for periodic floating payments from the swap counterparty dependent upon the inflation index.

According to various implementations, the entity issuing the inflation-linked securities may be a trust or a special purpose vehicle. In addition, the fixed income securities purchased by the entity may be from a single, previous offering from the issuer or may be newly issued by the issuer to the entity. Also, the end of the term of the inflation swap agreement may correspond to the maturity date of the fixed income securities acting as the collateral. The interest rate on the inflation-linked securities issued by the entity may correspond to the rate on the floating payments paid by the swap counterparty to the entity pursuant to the inflation swap agreement. In addition, the periodic fixed payments paid to the swap counterparty by the entity pursuant to the inflation swap agreement may correspond to the coupon rate on the fixed-income securities purchased by the entity.

DESCRIPTION OF THE FIGURES

Embodiments of the present invention are described herein by example in conjunction with the following figures, wherein.

DESCRIPTION

Figure 1:
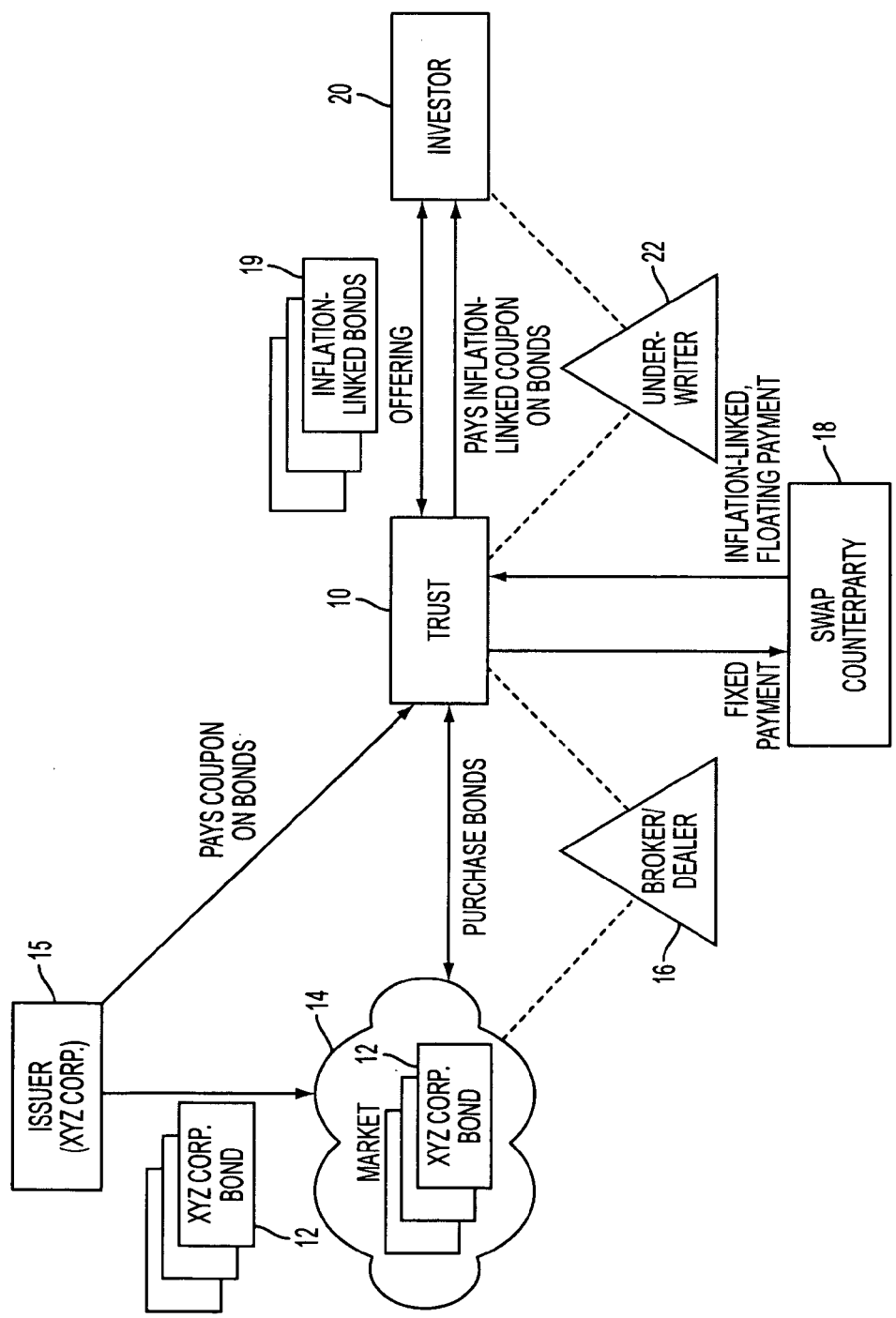
FIG. 1 is a diagram of a transaction structure for issuing inflation-linked securities according to various embodiments of the present invention.

FIG. 1 illustrates a transaction structure according to various embodiments of the present invention for issuing inflation-linked securities 19. The inflation-linked securities 19 may be, for example, inflation-linked bonds, notes, loans, trust-preferred shares, or any other type of financial instrument. For the sake of convenience, the inflation-linked securities 19 are sometimes referred to herein as "inflation-linked bonds," although it should be recognized that the invention is not so limited.

As shown in FIG. 1, a trust 10 may purchase previously issued fixed income securities 12 from the market 14 for such securities. The fixed income securities 12 may be, for example, bonds previously issued by an issuer 15 as part of a particular offering. The issuer 15 may be, for example, a private (i.e., non-governmental) company (e.g., XYZ Corp. in FIG. 1), a sovereign entity or a government sponsored enterprise (GSE). The issuer 15 may also be a publicly traded company. All of the securities 12 purchased by the trust 10 as part of the transaction structure may be from a single, previous offering by the issuer 15.

As such, the fixed income securities 12 purchased by the trust 10 may all have the same maturity date, coupon rate, etc. For reasons that will become apparent below, the particular fixed income securities 12 chosen for the transaction structure may have to satisfy certain criteria to serve as the trust's collateral for the inflation-linked bonds 19, including, for example, but not limited to, (1) the fixed income securities 12 may have to have a sufficiently long term remaining (e.g., at least 8 years), (2) the fixed income securities 12 may preferably be non-callable and non-putable, (3) the credit rating of the issuer 15 may have to meet or exceed a threshold credit rating, (4) there must preferably be a sufficient quantity of the bonds 12 available in the market 14, and (5) the size of the previous issue from the issuer 15 may preferably be greater than a certain threshold value (e.g., at least a $500M offering).

A broker/dealer 16 may broker the purchase of the fixed income securities 12 by the trust 10. As part of the purchase transaction, the trust 10 buys the fixed income securities 12, via the broker/dealer 16, from the holders of the fixed income securities 12 in the market 14. As the new holder of the fixed income securities 12, the issuer 15 will pay the coupon on the fixed income securities 12 to the trust 10.

According to other embodiments, rather than purchasing previously issued bonds from the market 14, the trust 10 may purchase the bonds 12 directly from the issuer 15 as part of a new issue by the issuer. In that case, the bonds 12 may accordingly have the same maturity date, coupon rate, etc.

Additionally, as illustrated in FIG. 1, the trust 10 may enter into an inflation swap agreement with a swap counterparty 18. The inflation swap agreement may obligate the trust 10 to pay a fixed payment to the swap counterparty 18 in exchange for a variable payment from the swap counterparty 18 that is a function of an inflation index, such as the Consumer Price Index (CPI). For example, the trust 10 may pay the interest payments on the fixed income securities 12 to the swap counterparty 18. The swap counterparty 18 in turn may make periodic payments to the trust 10 equal to, for example, a notional amount (e.g., equal to the outstanding principal amount) times the sum of the percent change in the inflation index plus some spread. For example, the swap counterparty 18 may make payments to the trust 10 corresponding to the year-to-year percent change in the CPI (denoted as "YOY %$\Delta$CPI") plus some spread (e.g., 2%, 3%, etc.). The spread amount could be determined, for example, by a computerized derivative pricing and risk management system. The term of the inflation swap agreement may match the remaining term of the fixed income securities 12. The swap counterparty 18, for example, may be the same as, or otherwise related to, the broker/dealer 16.

In addition, as illustrated in FIG. 1, the trust 10 may issue the inflation-linked securities 19 to investors 20 as part of an offering by the trust 10. The inflation-linked securities 19 may be, but are not limited to, debt securities (e.g., bonds or notes) or trust-preferred shares comprising a principal amount and an interest rate. The principal amount and/or the interest rate are related to an inflation index, such as CPI. For example, the interest rate for the inflation-linked securities 19 may correspond to the payments by the swap counterparty 18 to the trust 10 pursuant to the inflation swap agreement. The inflation-linked securities 19 may have, for example, a maturity date corresponding to the maturity date of the fixed income securities 12 issued by the issuer 15. An underwriter 22 may underwrite the offering. The underwriter 22 may be the same as, or otherwise related to, the broker/dealer 16. Also, the periodic rate legs for the fixed income bonds 12 and the inflation-linked securities 19 may be different. For example, the bonds 12 may pay semiannually and the inflation linked securities 19 may pay monthly.

Figure 2:
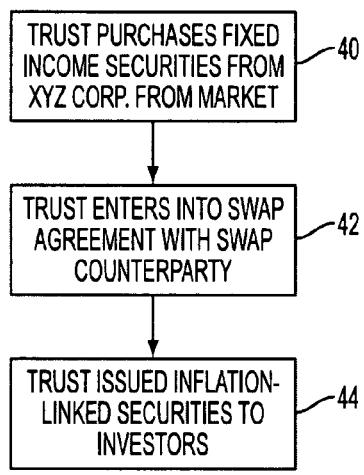
FIG. 2 is a flowchart illustrating the various steps of the parties in establishing the transaction structure according to various embodiments of the present invention.

FIG. 2 is a flowchart illustrating the various steps of the parties in establishing the transaction structure according to various embodiments of the present invention. At step 40, the trust 10 may purchase, via the broker/dealer 16, the fixed income securities 12 issued by the issuer 15. At step 42, the trust 10 may enter into the inflation swap agreement with the swap counterparty 18. At step 44, the trust 10 may offer the inflation-linked securities 19 to the investors 20 as part of an offering. The steps of FIG. 2 may be performed in various orders.

Figure 3:
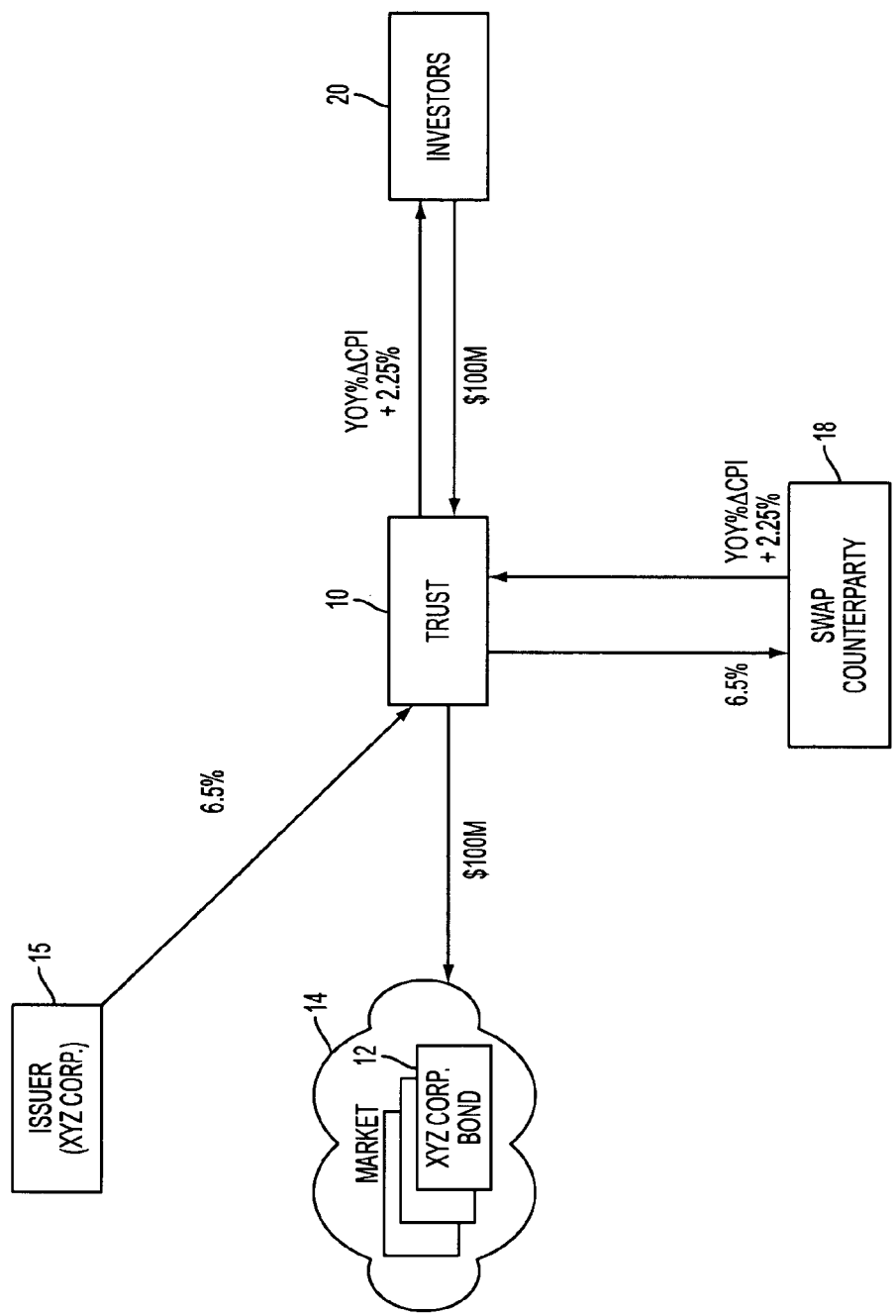
FIG. 3 is a diagram of an example of the flow of payments according to various embodiments of the transaction structure of FIG. 1.

FIG. 3 is an example of the flow of payments according to various embodiments of the transaction structure. As illustrated in the example of FIG. 3, the trust 10 pays $100M to purchase the XYZ Corp. bonds 12 from the current holders of such bonds. Alternatively, as discussed above, the trust 10 could purchase newly issued securities from the issuer 15. The issuer (XYZ Corp.) 15 pays the coupon rate, in this example, 6.5%, on the bonds to the trust 10 as the holder of the bonds 12. Pursuant to the inflation swap agreement with the swap counterparty 18, the trust 10 pays a portion of the interest payments on the bonds 12 to the swap counterparty 18. The trust 10 may pay for example, the entirety of the interest payments on the bonds less any trust-related fees. The swap counterparty 18 in turn pays a floating payment to the trust 10 that is related to an inflation index. In the example of FIG. 3, the swap counterparty 18 pays an amount corresponding to the year-to-year percent change in the CPI (YOY %$\Delta$CPI) plus a spread, in this case 2.25%. The trust 10 in turn may offer $100M (or more or less) worth of the inflation-linked securities 19 (see FIG. 1) to the investors 20. The inflation-linked securities 19 may have an interest rate corresponding to the floating rate paid by the swap counterparty 18 under the inflation swap agreement, namely YOY %$\Delta$CPI+2.25% in this example.

In such a transaction structure, a market for inflation-linked securities using bonds from XYZ Corp. may be created, even though XYZ Corp. may not prefer to issue inflation-linked bonds itself. In this way, the credit characteristics of inflation-indexed products can be altered and the supply of inflation-linked investment products may be increased.

The XYZ Corp. bonds 12 purchased by the trust 10 may act as the trust's collateral for the transaction. For this reason, as expressed above, an appropriate issuer 15 for the transaction structure must be selected. The trust 10 preferably must secure enough of the bonds 12 from the issuer 15 in the market 14 (or in a primary purchase) as collateral to support the offering of the inflation-linked securities 19 to the investors 20. Preferably, the size of the initial offering of the issuer 15 is large enough such that the trust 10 can buy enough of the bonds 12 to support its offering without moving the market against itself.

Figure 4:
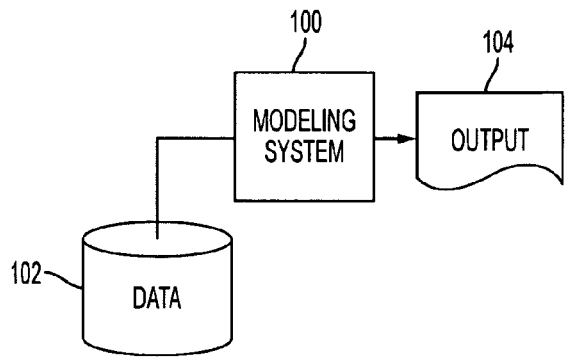
FIG. 4 is a diagram of a modeling system according to various embodiments of the present invention.

The swap counterparty 18 faces the risk that inflation may increase dramatically, thus reducing the value of the inflation swap agreement to the swap counterparty 18. In addition, the transaction structure is also exposed to the risk that XYZ Corp. may default on its payment obligations for the bonds 12. Because the transaction structure is exposed to the risk that the issuer 15 (e.g., XYZ Corp.) may default on its payment obligations on the bonds 12, a correlation between inflation and the likelihood of that issuer defaulting under various market and economic conditions may be analyzed to select the appropriate issuer 15 for the transaction structure. FIG. 4 is a diagram of a modeling system 100 for modeling the correlation between inflation and the likelihood of default under different market and economic conditions. The modeling system 100 may model the correlation based on data stored in a database 102, and based on that data produce an output 104 that reflects the potential loss to an inflation swap counterparty should the issuer default and/or include the price of that credit risk. The modeling system 100 may be implemented as software code to be executed by a processor(s) of the computing device (not shown), using any type of computer instruction type suitable, such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium such as a hard drive or a floppy disk, or an optical medium such as a CD-ROM. The computing device may be, for example, a server, a workstation, a personal computer, etc.

According to other embodiments, the trust 10 may be any other type of special purpose vehicle (SPV) such as a limited liability company (LLC), offshore company, etc.

Figure 5:
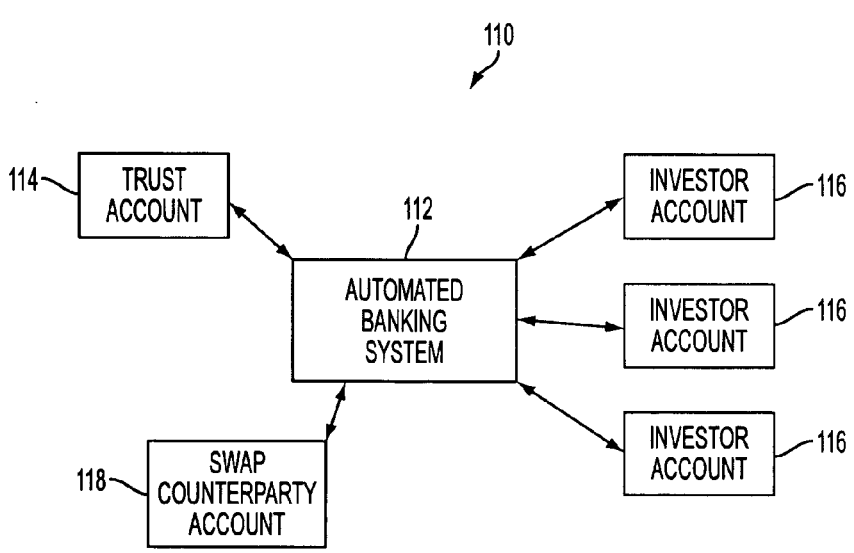
FIG. 5 is a diagram of a system according to various embodiments of the present invention.

FIG. 5 is a diagram of a system 110 according to various embodiments of the present invention. As illustrated in FIG. 5, the system 110 may include an automated banking system 112. The automated banking system 112 may be used, for example, to electronically transfer funds from an account 114 of the trust 10 to accounts 116 of the investors 20, such as from payment of the interest on the inflation-linked securities 19. Similarly, the automated banking system 112 may transfer funds between the trust account 114 and an account 118 of the swap counterparty 18 pursuant to the inflation swap agreement.

While several embodiments of the invention have been described, it should be apparent, however, that various modifications, alterations and adaptations to those embodiments may occur to persons skilled in the art with the attainment of some or all of the advantages of the present invention. For example, the steps described above in connection with the various transaction structures may be performed in various orders. It is therefore intended to cover all such modifications, alterations and adaptations without departing from the scope and spirit of the present invention as defined by the appended claims.

What is claimed is:

1. A method, comprising:
    determining, using a computer, for each of at least one private issuer of fixed income securities, a correlation between inflation and a likelihood that the private issuer will default on the fixed income securities, wherein the computer comprises a processor and a memory;
    selecting one of the at least one private issuer based on the correlation determined for each of the at least one private issuer;
    purchasing, by a trustee on behalf of a trust, fixed income securities issued by the selected private issuer, wherein the fixed income securities have a first maturity date;
    entering into, by the trustee on behalf of the trust, an inflation swap agreement with a swap counterparty, wherein the inflation swap agreement obligates the trust to make periodic fixed payments to the swap counterparty in exchange for periodic floating payments from the swap counterparty dependent upon an inflation index; and
    issuing, by the trustee on behalf of the trust, inflation-linked securities to investors, wherein the inflation-linked securities comprise a principal amount and an interest rate, and wherein at least one of the principal amount and the interest rate are related to the inflation index, wherein the inflation-linked securities have a second maturity date that matches the first maturity date of the fixed income securities, and wherein the inflation-linked securities are backed by the fixed income securities of the selected private issuer so that the investors can own inflation-linked securities backed by fixed income securities of the selected private issuer, without the selected private issuer having to issue the inflation-linked securities.

2. The method of claim 1, wherein the trust is a limited liability company.

3. The method of claim 1, wherein the trust is a special purpose vehicle.

4. The method of claim 1, wherein the fixed income securities purchased by the trust were previously issued by the selected private issuer as part of a single, previous offering by the selected private issuer.

5. The method of claim 1, wherein the fixed income securities purchased by the trust are directly purchased from the selected private issuer by the trust.

6. The method of claim 1, wherein the end of the term of the inflation swap agreement corresponds to the first maturity date of the fixed income securities.

7. The method of claim 1, wherein an interest rate on the inflation-linked securities issued by the trust is related to the rate on the floating payments paid by the swap counterparty to the trust pursuant to the inflation swap agreement.

8. The method of claim 1, wherein an interest rate on the periodic fixed payments paid to the swap counterparty by the trust pursuant to the inflation swap agreement is related to the coupon rate on the fixed-income securities purchased by the trust.

\* \* \* \* \*

UNITED STATES PATENT AND TRADEMARK OFFICE
CERTIFICATE OF CORRECTION

PATENT NO. : 7,650,306 B2  Page 1 of 1
APPLICATION NO. : 10/806835
DATED : January 19, 2010
INVENTOR(S) : Barany et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Twenty-third Day of November, 2010

David J. Kappos
*Director of the United States Patent and Trademark Office*